(No Model.) 6 Sheets—Sheet 2.
A. CAVALLI.
NAILING MACHINE FOR BOOTS OR SHOES.
No. 310,932. Patented Jan. 20, 1885.
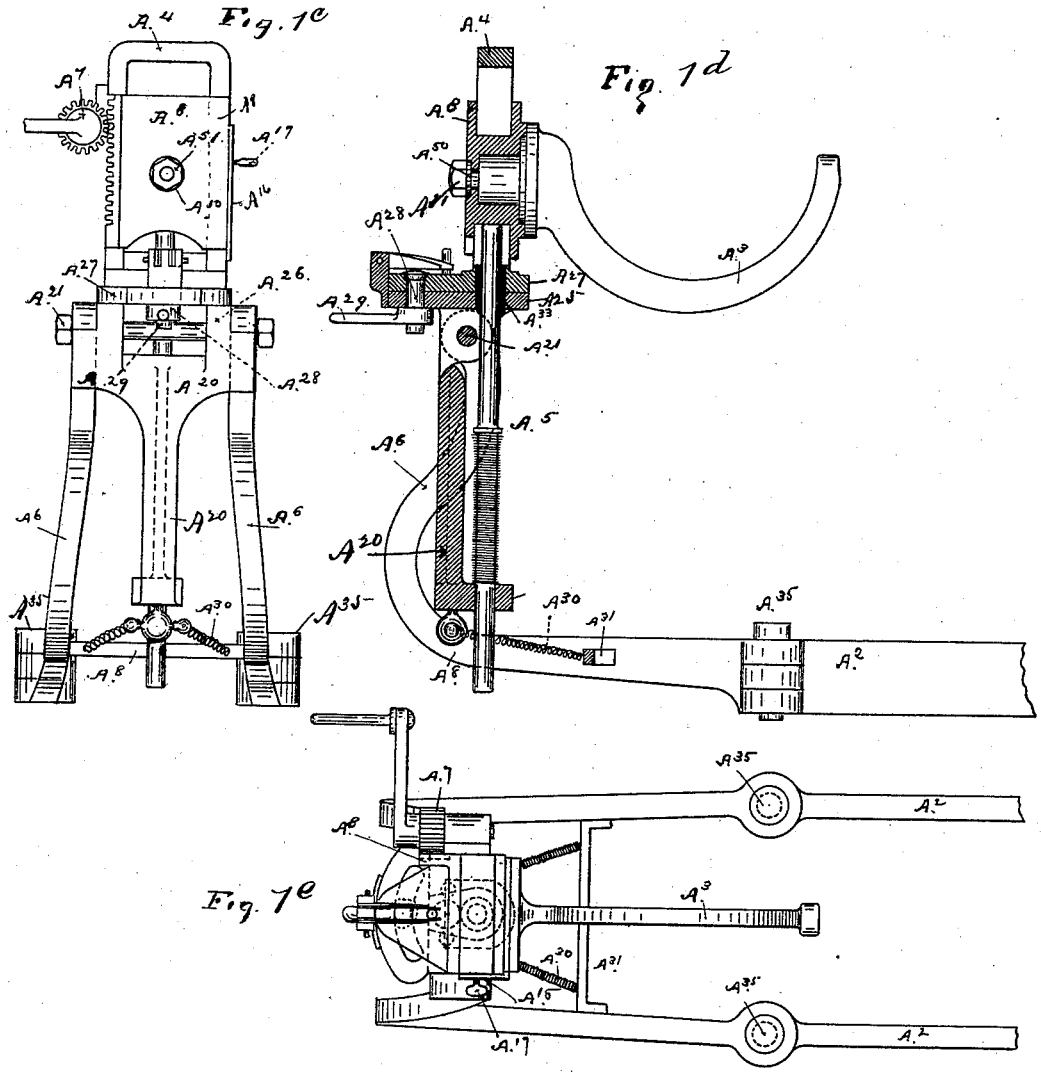

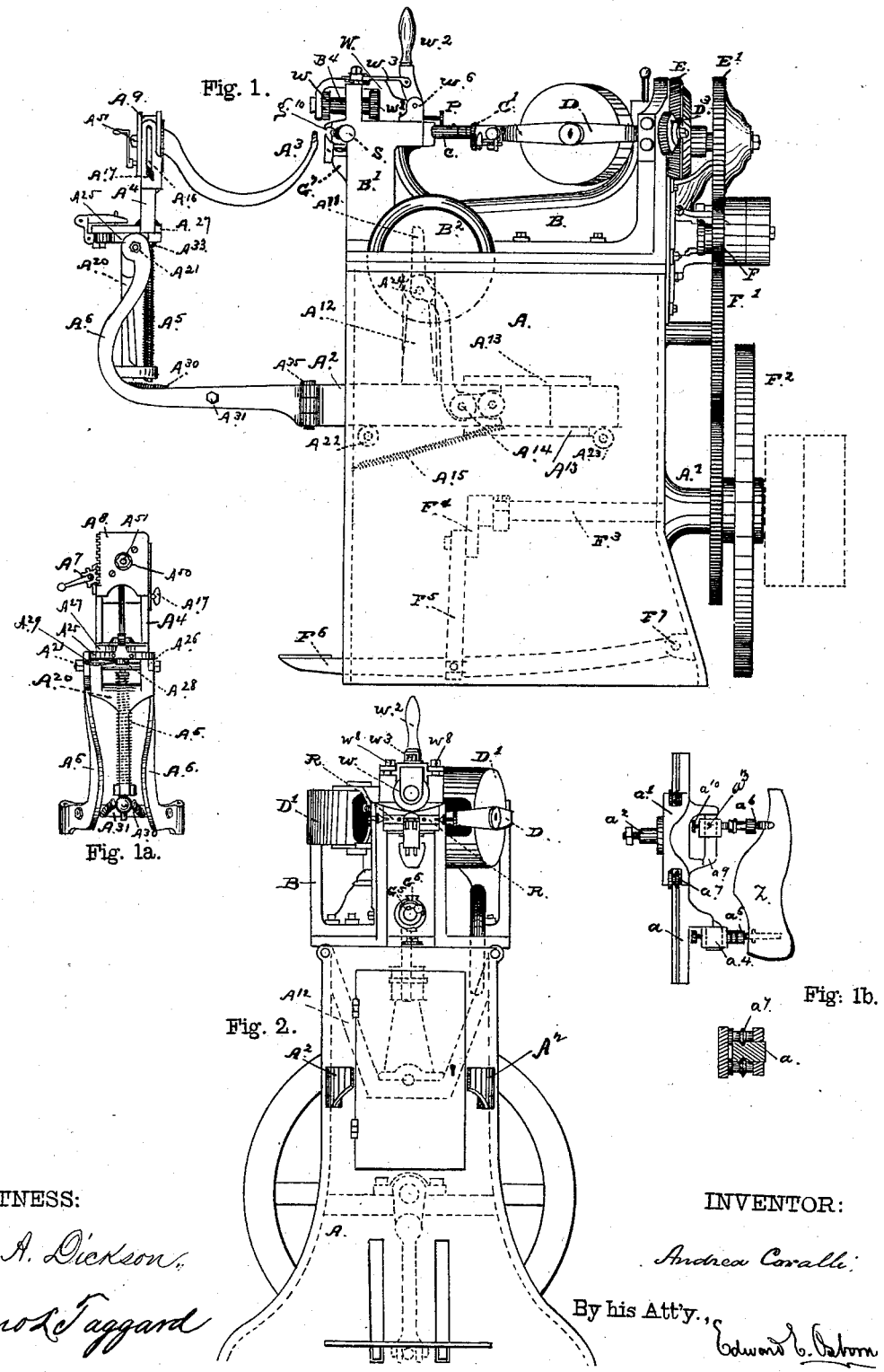

(No Model.)
6 Sheets—Sheet 3.
A. CAVALLI.
NAILING MACHINE FOR BOOTS OR SHOES.
No. 310,932. Patented Jan. 20, 1885.
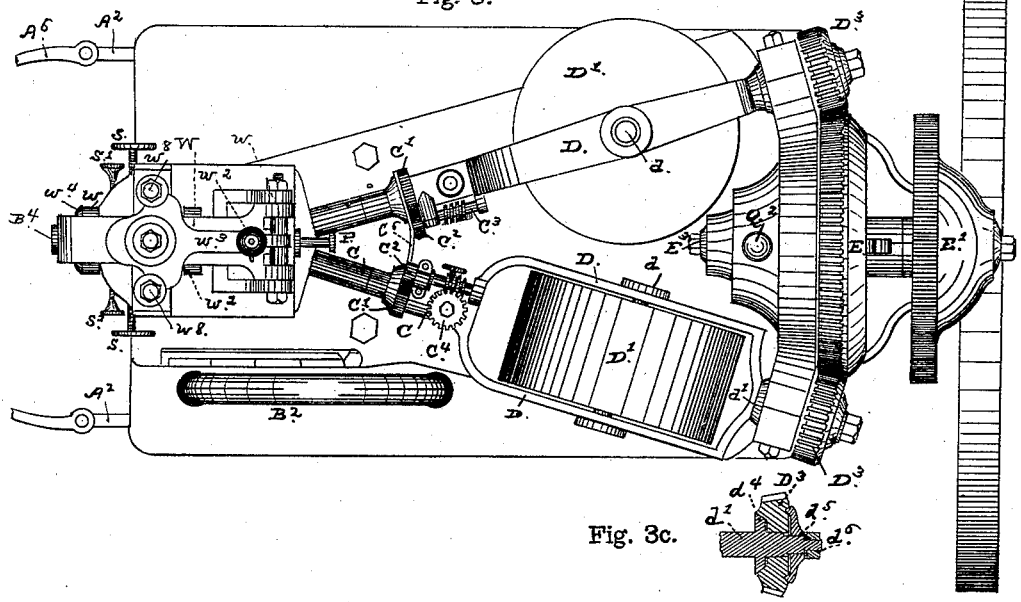
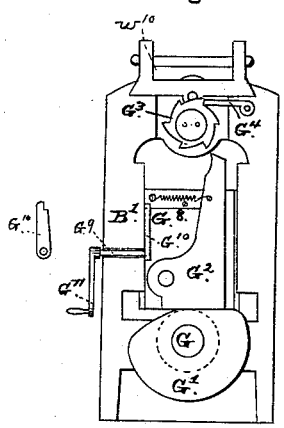
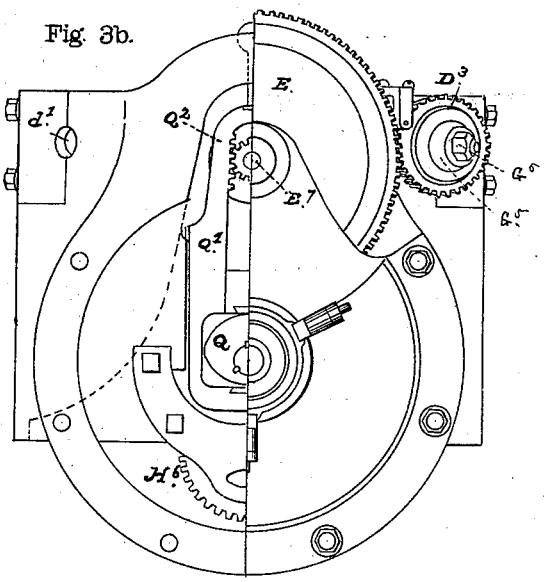
WITNESS:
G. A. Dickson
Jno. L. Taggard
INVENTOR:
Andrea Cavalli
By his Att'y, Edward E. Osborn (No Model.) 6 Sheets—Sheet 4.
A. CAVALLI.
NAILING MACHINE FOR BOOTS OR SHOES.
No. 310,932. Patented Jan. 20, 1885.
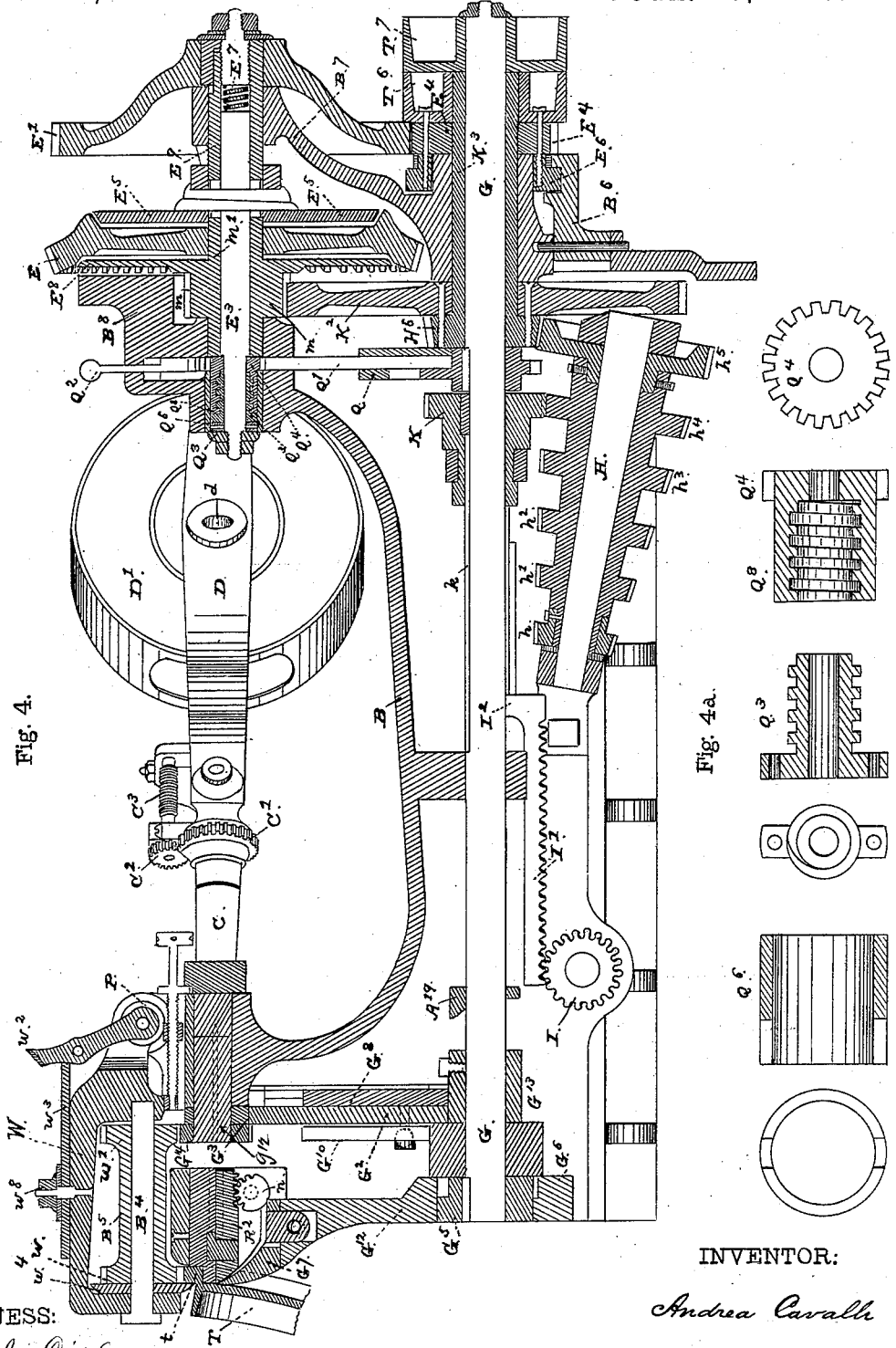
WITNESS:
G. A. Dickson
Jno. L. Taggard
INVENTOR:
Andrea Cavalli
By his Att'y, Edward E. Osborn

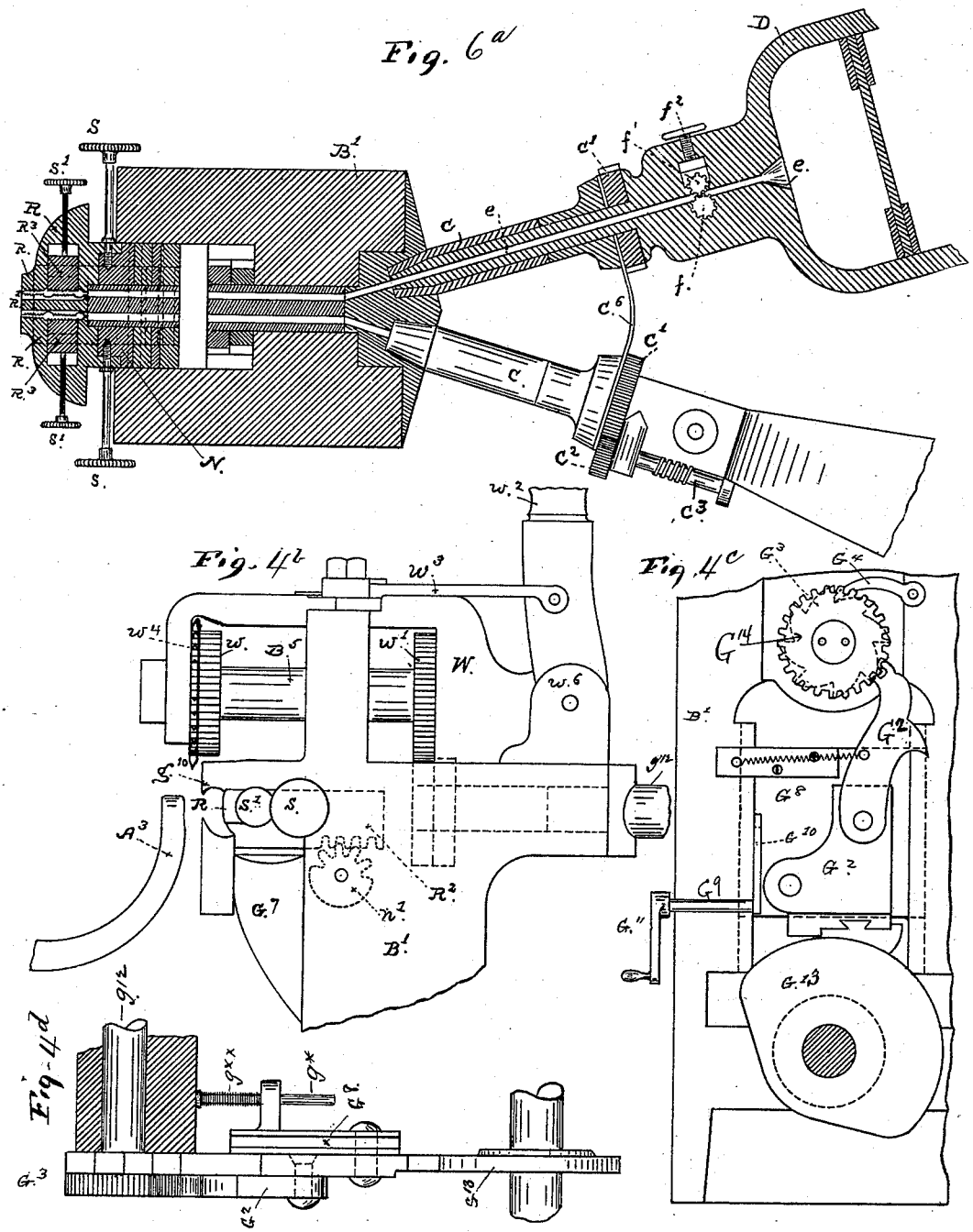

(No Model.) 6 Sheets—Sheet 6.
A. CAVALLI.
NAILING MACHINE FOR BOOTS OR SHOES.
No. 310,932. Patented Jan. 20, 1885.
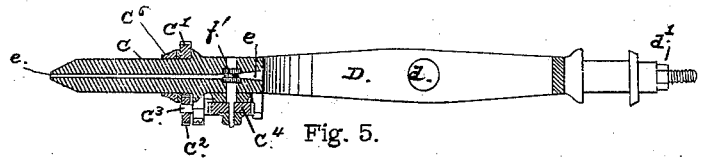
Fig. 5.
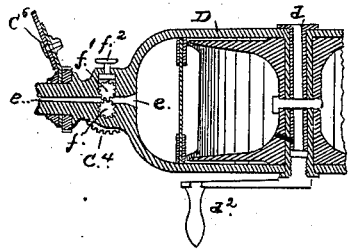
Fig. 6.
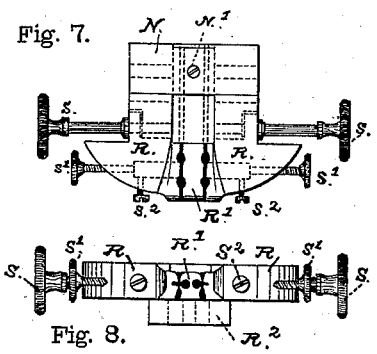
Fig. 7.
Fig. 8.
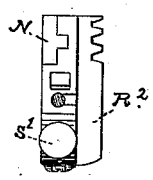
Fig. 9.
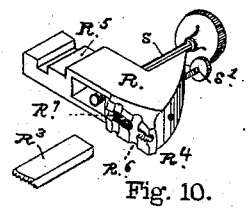
Fig. 10.
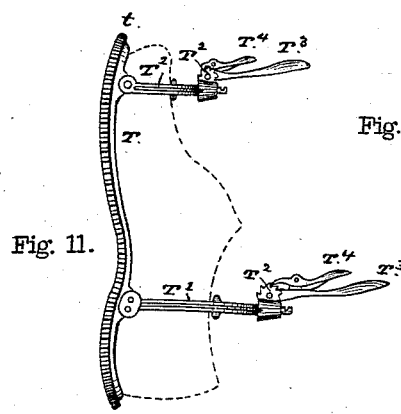
Fig. 11.
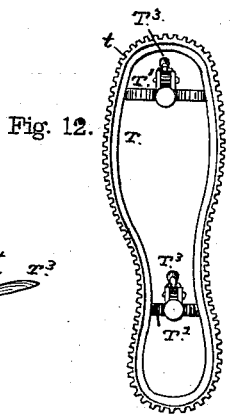
Fig. 12.
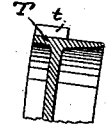
Fig. 13.
WITNESS:
G. A. Dickson
Jno. L. Taggard
INVENTOR:
Andrea Cavalli
By his Att'y, Edward E. Osborn

UNITED STATES PATENT OFFICE.

ANDREA CAVALLI, OF SAN FRANCISCO, CALIFORNIA.

NAILING-MACHINE FOR BOOTS OR SHOES.

SPECIFICATION forming part of Letters Patent No. 310,932, dated January 20, 1885.

Application filed September 7, 1883. (No model.)

*To all whom it may concern:*

Be it known that I, ANDREA CAVALLI, a citizen of the United States, residing in the city and county of San Francisco, and State of California, have made and invented certain new and useful Improvements in Machines for Forming, Inserting, and Fixing Cable-Wire Fastenings into Soles of Boots and Shoes; and I do hereby declare that the following is a full, clear, and exact description of my said invention, the accompanying drawings being referred to as a part of the specification.

My invention relates to machines for forming and fixing metal fastenings into the soles of boots and shoes to unite the uppers and soles together, and it includes several novelties, both as to construction and combination of parts and mechanism, as are hereinafter at length and particularly described and pointed out.

My improvements in such class of machines consist, first, of a novel construction of jack-standard or mechanism for supporting and operating or controlling the jack upon which the work is placed. Combined and co-operating with such part of my improvements are automatic feeding or sole-turning devices to space the fastenings.

My improvements consist, secondly, of certain novel construction of screw-cutting dies, by which a spiral groove is formed in a continuous length of wire, a wire-feeding mechanism by which the wire is forced through the dies and driven into the soles with a rotary movement from off a reel or bobbin, and a cutting-off tool by which the driven wire is separated from the continuous cable or length of grooved wire close to the surface of the sole.

My improvements consist, thirdly, of certain novel construction and combination of parts and mechanism whereby the length of fastening formed and driven may be regulated to accommodate different thickness of work and the machine made capable of operating upon any grade of work.

The manner in which I proceed to construct, combine, apply, and operate my several improvements is fully set forth in the following description, and illustrated in the accompanying drawings, being referred to by figures and letters as follows:

Figures 1 and 2 are side and front elevations of the machine set upon a stand, wherein are provided a foot-lever for running the machine by foot, and also a pulley-shaft by means of which power can be employed, if desired. Figs. $1^a$ and $1^b$ are details of the jack and its standards. Fig. $1^c$ is a front elevation of the jack-holder on an enlarged scale. Fig. $1^d$ is a central vertical section of the same, taken at right angles to Fig. $1^c$. Fig. $1^e$ is a plan view of the same. Fig. 3 is a top view of the machine with the jack removed. Figs. $3^a$ and $3^b$ are detail views taken from opposite ends of the machine, one from the front and the other from the rear end. Fig. $3^c$ shows details of the driving-pinion $D^3$. Fig. 4 is a vertical section taken longitudinally through the center of the machine. Fig. $4^a$ is an enlarged detail view of the portions of the extensible screw-hub detached. Fig. $4^b$ is an enlarged view of the feeding-wheels and cutting-off die, showing the jack in place. Fig. $4^c$ is an enlarged front elevation of the feeding mechanism. Fig. $4^d$ is a side elevation of the same. Figs. 5 and 6 are details of the reel or bobbin and its holding-case and rotating frame or whirl, showing also the wire-feeding device. Fig. $6^a$ is a view showing a section of the screw-forming dies and the support in which they are held, and of one of the guide-tubes taken on a horizontal plane about centrally of the parts, and also showing in plan view the other guide-tube. Figs. 7, 8, 9, and 10 are details of the dies and connected parts, constituting the screw or spiral thread-forming mechanism, the first three views of which give plan, side, and front of the jaws, and the last figure a perspective view of one of the die-holding jaws and its changeable die. Figs. 11, 12, and 13 are details of the clamps for holding un-lasted work.

The stand A has an open top with a surrounding flange to support the machine-frame B, which is set into the top, so that the stand being closed in on all sides the internal mechanism is protected from dust. Access to the inside of the stand is had at the front through a wicket, Fig. 2. Through slots in the front of the stand two bars, $A^2 A^2$, extend to the inside, where they are set upon anti-friction rollers $A^{22} A^{23}$, and are confined between ribs $A^{13}$. (Shown in dotted lines, Fig. 1.) These rollers and ribs or guides are situated on the inner side of the casing and are employed to hold the bars $A^2$ in a horizontal position while permitting a reciprocating movement. The ends of the bars $A^2$ outside the stand A are provided with knuckles $A^{35}$, by means of which two upwardly-curving bows, $A^6$, are secured to the bars $A^2$, and these bows, extending upward, support the swinging jack-standard $A^4$ between the outer ends. To this supporting-frame a reciprocating movement back and forth is given from the principal shaft of the machine above by means of the following mechanism: A lever, $A^{14}$, is pivoted at $A^{24}$ in a hanging bracket, $A^{12}$, secured within the stand. The lower end of this lever is connected to the bars $A^2$, and the upper end, $A^{11}$, extending up into the body B of the machine is in line with a cam, $A^{19}$, fixed on the shaft G. The vertical face of this arm of the lever is held against the cam by a spring, $A^{15}$, of which one end is secured to the side of the stand A, and the other is attached to the bars $A^2$. The form of this cam is such that at each revolution of the shaft G the frame $A^2$ $A^6$ is moved forward toward the face or head of the machine with a gradually-increasing movement, and then after a given length of such movement the tappet-arm $A^{11}$, which forms the top of the lever $A^{14}$ is released and the spring $A^{15}$ permitted to throw the frame back. Cam $A^{19}$ is a cam having an inclined vertical face, as indicated in Fig. 4, against which the part $A^{11}$ bears. In consequence of these movements of the frame the jack or work-holder is brought up against the head of the machine with a gradually-increasing pressure at each time of action of the wire driving or screwing mechanism, and thus as the wire enters the sole the jack is pressed forward with increasing force to meet the wire, and the time of greatest pressure is reached as the end of the wire protrudes through the sole on the inside and strikes the face of the jack.

The jack-standard is composed of three parts—a rocking leg, $A^{20}$, having a top plate, $A^{25}$, at right angles to the leg, and ears $A^{26}$ for a center bolt, $A^{21}$, a slotted frame or yoke, $A^4$, and a sliding head, $A^8$, set into and movable up and down within the yoke. Connection of the yoke to the lower part or leg, $A^{20}$, of the standard is made by a swivel-joint to permit the yoke to swing or be moved in a horizontal direction upon a center, $A^{33}$. This joint is composed of the top plate, $A^{25}$, of the leg, a foot-plate, $A^{27}$, on the end of the yoke of similar shape and resting on the top plate, and the pivot $A^{33}$, formed of a tubular bolt with a head on both ends to confine the plates and yet permit sliding movement one upon the other. The bottom plate is slotted concentrically with the center of motion, and a stud, $A^{28}$, fixed on the top plate, works through the slot, its end being screw-threaded. A jam-nut, $A^{29}$, applied from beneath the plate $A^{25}$, serves to clamp the two plates together and hold the yoke or upper part of the standard in any position of adjustment. The bolt $A^{21}$ passes through the ears $A^{26}$ of the part $A^{20}$, and is fixed in the ends of the bows $A^6$. This forms the center of a vertical rocking motion for the standard. The adjustable slide $A^8$ carries the jack or work-holding device. It is fixed on the end of an upright rod, $A^5$, that passes down through the hollow pivot $A^{33}$, and at the lower end takes through a socket on the bottom of the leg $A^{20}$. A coil-spring surrounds this rod, by the action of which the head is pressed upward in the yoke $A^4$.

To move and set the slide $A^8$, a small shaft carrying a pinion, $A^7$, is fixed in bearings on one side of the yoke, and a rack is cut on the side of the head to take the pinion. By means of a crank-handle provided on the pinion-shaft a vertical movement of the head is produced and the same adjusted within the yoke. The sides $A^9$ of the head are slotted to embrace the sides of the yoke, and a plate, $A^{16}$, secured to the head, is bent to ride over one of the bars of the yoke. It is slotted to admit a clamp-screw, $A^{17}$. This screw, taking into the side of the yoke, serves as the means for locking the head at any point within its supporting-frame. An upright position of the standard $A^{20}$ is obtained by springs $A^{30}$, attached at one end to the cross-bar $A^{31}$ within the bows, and connected to the socket on the bottom of the leg $A^{20}$ at the other end.

Upon the front of the head $A^8$ is bolted the work-support. This device may be the horn $A^3$, the jack $a$ $a'$, to take a last, Z, or the rack T, to hold lasted work. These different forms of jack are provided for the purpose of adapting the machine to different grades or quality of work, and the feed device or means whereby the work is turned to space the fastenings is capable of being changed to accommodate each particular kind of work and co-operate with the work-holder. For example, a piece of work placed on the horn $A^3$ will be turned by engagement of a feed-wheel with the edge of the sole direct, while by substituting the clamp with a rack-frame, T, the feed-wheel will be a pinion, $w$, meshing with the rack and turning the clamp with a regular positive intermittent movement. This last-described feed will accommodate work that cannot readily be turned and spaced by feeding directly from the edge of the sole.

Figs. 1, 2, and $1^d$ show the form and attachment of the horn to the sliding head. By removing the nut $A^{50}$ the horn is detached and either the jack $a$ $a'$ or the clamp-frame T is substituted.

The jack shown in Fig. $1^b$ consists of a carriage, $a'$, with grooved or ribbed wheels $a^7$, an upright bar, $a$, having tracks on the side faces that are embraced by the wheels of the carriage $a'$ and vertically-adjustable last-carrying brackets $a^3$ $a^4$. The lower bracket is clamped on a lug projecting from the front of the bar. The upper bracket, $a^3$, has a slotted head movable up and down on a slide, $a^9$, and held by a clamp-screw, $a^{10}$. The ends of the studs carried by the brackets $a^3$ $a^4$ are screw-threaded to take into screw-threaded sockets $a^5$ $a^6$, fixed on top of the last-block Z.

On the back of the carriage $a'$ a boss, $a^2$, with a screw-threaded stud to set into the socket $A^{50}$ and provided with a nut, $A^{51}$, on the front of the head $A^8$, affords a means of fastening the carriage to the head. The sliding bar $a$ then gives vertical movement of the last to bring all parts of the work to the wire-driving mechanism as the required horizontal or lateral movement is permitted by the swing of the yoke on the center $A^{33}$.

Figs. 11, 12, 13 show the clamp-frame T to receive lasted work. The rack $t$ around the edge conforms to the shape of the sole, and by the fineness of its gear-teeth regulates the spaces between the fastenings. As thus constructed the jack and standard or operating-frame have a universal movement that adapts it to work on all forms and shapes.

I lay no claim in this application to the form of jack, and have shown the three forms in order to illustrate the adaptability of my machine for working with any of them.

The screw forming and driving mechanism consists of a bobbin mounted in a wheel or rotating frame, D, and a guide-tube, C, having a pair of corrugated feed-rollers, $f f'$. The frame is driven from a gear, E, by a pinion, $D^3$, fast on a spindle, $d'$, that projects from the back of the bobbin-frame D, and rests in bearings on the neck $B^8$ of the machine-body B.

The essential features of this device for drawing off and forcing the wire through a thread-cutting mechanism are embraced in a prior invention patented to me on the 12th day of April, 1873; but in the present machine I have improved both the feed mechanism and the screw-forming dies. As now constructed the wire being drawn from the bobbin in a continuous length is forced by the feed through a set of stationary dies that form a continuous spiral groove or thread, and the revolving motion imparted to the wire to produce such spiral groove from stationary dies is also employed to drive the wire into the sole. This force-feed consisting of the rollers $f f'$ is operated by the whirling movements of the frame as follows: Around the guide-tube at the front end of the bobbin-frame is a fixed collar having a gear-ring, $C'$, on its periphery, and held by a brace, $C^6$, so that it is stationary and the tube turns in it. A pinion, $C^2$, on the end of a short worm-shaft, $C^3$, mounted on the bobbin-frame, is set to gear with this ring, which being fixed imparts a revolving motion to the worm-shaft as the frame rotates. The motion of this worm is imparted to the axle of the feed-rollers $f$ by the worm-wheel $C^4$. The other feed-roller, $f'$, is held up to the wire by an adjustable brake, $f^2$, regulated by a screw, and pressure of this roller against the wire is increased or diminished as required.

The screw-forming dies consist of two jaws, R R, secured to a stock-plate, N, on the under side of which is a rack, $R^2$, to engage with a setting-pinion, $n$, placed in the machine-body and having a rod with a head or handle by which the dies are moved back or forth for adjustment at the front of the machine. These jaws R are secured to the stock by screws that take through the jaws and enter the sides of the stock, and in addition to such office they serve to move and set the jaws laterally to and from the center fixed tongue, $R'$. In the sides of this tongue are channels to hold the wire for the cutting-dies to work against. In the adjustable jaws are two sets of dies, the principal one of which in each jaw is made detachable to be changed when worn down, as it performs the heaviest part of the work; but the finishing-die is formed integral with the plate or jaw. The removable die $R^3$ sets in a socket in the jaw, and is adjustable by means of a feed-screw, $S'$, working against the back of the die. A set-screw, $S^2$, holds the die in position when adjusted for work. Figs. 7, 8, 9, and 10 show these parts and their connection together.

At the front of the machine is the cutting-off tool, consisting of a curved beak, $G^7$, with a broad cutting-edge held just beneath the apertures of the screw-forming dies, where the screw-wire is projected and against a fixed cutter, $g^{10}$. Reciprocating motion is given to the cutter from a slide, $G^{12}$, working in grooves in the front of the frame $B'$, and two cams, $G^5$ $G^6$, on the shaft G. These cams are immediately in front of the feed-actuating cam $G^{13}$. The cutting-edge $G^7$ works against a fixed blade, $g^{10}$, projecting from the face-plate of the frame B. The relative movements of the screw forming and feeding mechanism and this cutting-off tool are susceptible of change and adjustment to produce different lengths of fastenings according to the thickness of work to be operated on, and this adjustment is effected by changing the size of driving-gear for the principal shaft G after the following manner: The shaft G, as before described, gives motion to the jack-standard through the medium of the cam $A^{19}$, and to the cutting-off tool through the double cam $G^5$ $G^6$. It also gives motion to the feed-wheel $w$, by which the work is turned through the cam $G^{13}$, through the medium of the slide $G^8$ and connected mechanism, as will hereinafter be explained. Its own motion is derived from a pinion, K, and a set of cone-gears, H $h'$ $h^2$ $h^3$, &c., that are driven from the gear $K^2$ through the bevel-gears $H^6$ $h^5$, one on the head of the set of gears H, and the one fixed to the gear-wheel $K^2$. The pinion K is keyed to the shaft G by a groove and feather, $k$, to slide back and forth and be thrown into any one of the set of cone-gears. The time of action of the parts deriving their movements from the shaft G is thus changed with respect to the movement of the revolving bobbin-frame, and a longer or shorter fastening can be driven and cut according as the work requires it. The pinion K is set to any one of the gears on the driving-cone H by means of a sliding rack-bar, I', attached at its end I² to the pinion and at the other end working in a toothed wheel, I. A hand-wheel, B², on the outside of the machine is fixed on the shaft of the wheel I for throwing the pinion K.

Connection of the driving-cone H with the mechanism by which the bobbin-carrying frames D are rotated is effected as follows: A loose sleeve, K³, has bearing in the hub of a bracket or extension, B⁷, at the rear of the machine-body B. The shaft G passes through this sleeve, but is disconnected from it, and the cone-bevel pinion $h^5$ is geared into a pinion, H⁶, on the inner end of this sleeve, the outer end of which carries a belt-pulley, T⁶. The spur-wheel K², fast on this sleeve, drives a pinion, $m$, that is part of a friction-clutch, E⁵ E⁸, embracing and acting upon a bevel-gear, E, the prime mover of the whirling frames and wire-feeding mechanism. By compression of the two clutch-disks E⁵ E⁸ together this interposed gear E is held by the friction of the edge of the disks against beveled seats in the faces of the gear, and rotation of all the parts is produced from the pinion. A reverse movement of the two disks E⁵ E⁸ releases the gear, and no movement of the pinions D³, meshing with it, can take place. The gear E is free on the hub $m'$ of the pinion $m$; but it is locked thereto by the action of the friction-clutch, the pinion $m$ being long enough to permit longitudinal movement while in gear with the wheel K². The spindle E³, supporting the sleeve $m\,m'$, has bearings in the part B⁸ of the frame B at the front end, and at the rear end it rests in a tubular socket on the bracket B⁷. In these two bearings it has longitudinal play, and while being disconnected from the one part, B⁸, of the clutch, it has the other disk, E⁵, of the clutch keyed fast to it. At the outer end it bears against a small coil-spring, E⁷, within the socket, and its inner end being reduced in diameter takes through a two-part screw-hub, Q³ Q⁸. The extreme outer end is screw-threaded and fitted with a nut. The screw-hub is extensible, it being made of an externally and an internally screw-threaded sleeve, Q³ and Q⁸, the contraction and extension of which is made to act upon the spindle and throw the clutch-disks E⁵ E⁸. On the part Q⁸ is a small pinion, Q⁴, engaging with a rack on one side of a reciprocating frame, Q', and from a cam, Q, fixed on the shaft G, this rack receives motion up and down within guides in the frame, Fig. 3ᵇ.

The mechanism by which the work is turned to space the fastening, designated by me as the "feeding" mechanism, is composed of a feed-wheel, $w$, journaled in a swinging clamp that is hinged at the back to the neck B' of the machine, and turning on this point is free to be thrown back clear of the work. A locking-plate, $w^3$, is fixed at the rear end to a locking-lever, $w^2$, having a fulcrum at the hinge P, and at the front end its extended sides take under the heads of two studs, $w^8\,w^8$, on the top of the frame on either side of the front end of the swinging clamp W. A forward movement of the locking-lever, when the clamp is down, will throw the locking-plate under the head of the stud $w^8$ and hold the feed-wheel down to work. The feed-wheel is formed on one end of a spool, B⁵, that is confined in the clamp by means of a slip-spindle, B⁴, taking through the front of the clamp and having a head by which to withdraw it in taking out the spool or tubular piece carrying the feed-wheel. On the end opposite the feed-wheel this piece B⁵ carries a pinion, $w'$, that gears into and is driven by a pinion, G¹⁴, formed in one piece with or fixed to a ratchet-wheel, G³. Movement of this ratchet-wheel is produced by a pawl, G², pivoted on and carried by a sliding plate, G⁸, working in vertical guides in the part B' of the machine, and resting on a cam, G¹³, on the principal shaft, G. A bracket on the back of slide G⁸ encircles a guide-bar, $g^*$, which is provided with a spring, $g^{**}$, to keep the slide G⁸ pressed down upon cam G¹³. The stroke of this pawl is controlled by a stop-arm, G¹⁰, centered at G⁹ on a rod that projects through the side of the neck or frame of the machine. The end of this stop is notched, and by throwing this end underneath the stop G¹⁰ on the plate G⁸ this vertical movement will be made longer or shorter and the stroke of the pawl will be varied accordingly. A handle, G¹¹, on the outside of the machine being connected with the center of movement of this arm the adjustment is readily made and the length of movement of the rotating wheel $w$ is varied as required. By this construction and arrangement of parts the length or amount of feed is controlled. The feed-wheel is changed by drawing out the spindle B⁴ and substituting another spool with feed-wheel of a different character.

To operate upon the edge of a boot or shoe sole or directly upon any piece of work, the feed-wheel will be a barbed or roughened or serrated wheel, while to operate upon the jack T it will be a pinion of suitable character to properly mesh with the teeth $t$ of the rack. By either character of feed the work will be turned with an intermittent movement, and in the intervals of rest the wire fastenings will be forced into the work and then cut off close to the face of the work by the cutting-off tool. While this turning to space the fastenings takes place, the whirling motion of the bobbin-cases and the action of the wire-feeding rollers are interrupted. The backward movement of the jack is also taking place, and the forward motion and pressure act as soon as the feed-rollers $f\,f'$ begin to drive the wire.

In connection with the other parts of the machine I have employed two sets of wire feeding and driving mechanism and two sets of screw-forming dies; but this double arrangement is not an essential feature of my improvement, because a machine can as well be constructed with one.

In Fig. 3ᶜ I show the manner of fixing the driving-pinion D³ upon the spindle. A collar, d⁴, fast on the shaft has a beveled edge to set into the face of the pinion D³, that is loose on the spindle, and a clutch-disk, d⁵, set on the spindle against the face of the pinion is pressed against this face by means of the nut d⁶, working on the screw-threaded end of the spindle. By loosening this nut the pinion can be released and allowed to run idly. Either one of the whirling frames is thus thrown out of action, as desired, and only one fastening at a time be driven.

Having thus fully described my invention, what I claim, and desire to secure by Letters Patent, is—

1. The combination, with the machine-supporting stand or base A, of the reciprocating frame A² A⁶, the swinging standard supported therein, the sliding head adapted to support a work-holding horn or jack, means, substantially as described, for moving and setting said sliding head, and mechanism for imparting to the said frame an intermittent reciprocating movement with respect to the time of action of the wire driving mechanism, substantially as described.

2. The combination of the supporting frame A² A⁶, the swinging frame A²⁰, having top plate pivoted in said frame, the yoke A⁴ with foot-plate A², the pivot A³³, the sliding head A⁸, having means, substantially as described, for moving and setting it within the yoke, and a locking device to hold it when set, and means for locking the two plates of the parts A⁴ A⁵ together when set, substantially as described.

3. The combination, with the supporting-frame A² A⁶, of the two-part jack-standard, the upper part carrying a sliding head to support a jack, and the springs A³⁰ at the lower end, for the purpose described.

4. The combination, with the jack-standard having the sliding head A⁸, of the carriage A′, having the slide-bar A, and a boss, A², by which to fix it to the sliding head; the adjustable screw-studs A³ A⁴, and the screw-threaded sleeves A⁵ A⁶, fixed to the top of a last-block, a work-holding form, and adapted to screw on to the screw-stud, substantially as described.

5. The combination of the swinging clamp W with feed-wheel having driving-pinion w′, spindle B⁴, locking-plate w³, studs w⁸, and a locking-lever for moving said plate, substantially as described.

6. The combination, with the swinging clamp W, pivoted in a sliding box, w¹⁰, in the bracket w⁶, of the set-screw P, substantially as described.

7. The combination, with the stationary dies R, of the whirling bobbin-carrying frame, the feed-wheels f f′, and mechanism for driving them from or by the rotation of the whirling frame, consisting, essentially, of the fixed gear C′, surrounding a part of the whirling frame and gear-connections to the said wheels, substantially as described.

8. The combination, with the whirling bobbin-carrying frame having the guide-tube C, of the stationary gear C′, worm-shaft C³, having pinion C², wheel C⁴, and feed-wheels f f′, and a friction-brake, f², substantially as described.

9. The combination, with the principal shaft G′, of the sliding pinion K, cone of gears H, bevel-pinion H⁵, sleeve K³, bevel-gear and spur-wheel K², giving motion to the wheel-actuating gear E.

10. The combination, with the principal shaft G, of the spindle E³, the sleeve E⁹, the gears E⁴ E² for driving it, the clutch-disk E⁵, locked to said sleeve, the sleeve carrying the clutch-disk E⁸, and having pinion m, the two-part extensible sleeve Q³ Q⁸, the rack Q′, the pinion Q⁴, and the cam on the shaft G.

11. The combination, with the stock N, of the movable die-plates R and the fixed tongue R′.

12. The combination, with the stock N, of the fixed tongue R′, movable die-plates R R, adjusting-screws S, separable dies R³, and holding-screws S².

13. The combination, with the stock N, having a fixed tongue or recessed die-plate, R′, of the detachable jaw R, having one stationary die, R⁴, and one removable die, R³, and the screws S S′ S².

14. The combination, with the shaft G, to which varying rates of speed are to be given, of the sliding pinion K, the set of cone-gears H, fixed on an inclined shaft and in gear with and deriving motion from a driver, as H⁶, substantially as described.

ANDREA CAVALLI. [L. S.]

Witnesses:
EDWARD E. OSBORN,
JNO. L. TAGGARD.